United States Patent [19]  
Miura et al.

[11] Patent Number: 4,763,748  
[45] Date of Patent: Aug. 16, 1988

[54] FOUR-WHEEL DRIVE VEHICLE

[75] Inventors: Masakatsu Miura, Kariya; Tatsuya Iwatsuki, Okazaki; Seitoku Kubo, Toyota, all of Japan

[73] Assignees: Aisin-Warner Limited, Anjo; Toyota Jidosha Kabushiki Kaisha, Toyota, both of Japan

[21] Appl. No.: 810,381

[22] Filed: Dec. 18, 1985

[30] Foreign Application Priority Data

Dec. 19, 1984 [JP] Japan ................. 59-267784

[51] Int. Cl.$^4$ ............................................. B60K 17/34
[52] U.S. Cl. ...................................... 180/248; 74/665 F
[58] Field of Search ............... 180/233, 247, 248, 249, 180/250, 252; 74/710, 713, 694, 674, 665 GB, 665 F

[56] References Cited

U.S. PATENT DOCUMENTS 4,286,686 9/1981 Franke .................. 180/233
4,450,734 5/1984 Makishima .............. 180/247

FOREIGN PATENT DOCUMENTS 26636 2/1983 Japan .................. 180/233
81226 5/1984 Japan .................. 180/248
2075933 11/1981 United Kingdom ........ 180/233

Primary Examiner—John J. Love
Assistant Examiner—Everett G. Diederiks, Jr.
Attorney, Agent, or Firm—Spencer & Frank

[57] ABSTRACT

A four-wheel drive vehicle has a front wheel side having a front wheel set, a rear wheel side having a rear wheel set, an engine having an output shaft extending in a transverse direction of a vehicular body, a transmission having an input shaft connected to the output shaft of the engine and an output shaft connected through a transmission mechanism to the input shaft such as to extend in a transverse direction of the vehicular body, a rotating member connected to the output shaft of the transmission, a front differential gear, a first output member connected between the rotating member and one of the wheel sets for transmitting power to one of the wheel sets through the front differential gear, a second output member coaxial with the first output member, a rear wheel propeller mechanism between the second output member and the other wheel set, and operative to convert the rotation of the second output member into rotation about an axis perpendicular to the axis of rotation of the second output member for driving the other wheel set, and a hydraulic friction clutch provided coaxially with the first and second output members to selectively connect the rotating member and the second output member.

3 Claims, 5 Drawing Sheets

FOUR-WHEEL DRIVE VEHICLE

BACKGROUND OF THE INVENTION.

This invention relates to a transversal engine four-wheel drive vehicle.

Generally, there is created rotational speed difference accompanied by difference in a turning radius between front wheels and rear wheels in turning of a vehicle. In a part-time type four-wheel drive vehicle having no center differential (an operating device for dividing a power to a front wheel drive shaft and a rear wheel drive shaft), when the vehicle is turned under a four-wheel drive condition on a paved road where slippage between a road surface and drive wheels is hardly created, there is disadvantageously generated a return torque (rotational difference of the drive shafts) between the front wheel drive shaft and the rear wheel drive shaft. For this reason, in case of running on a road of high coefficient of friction such as a paved road, four-wheel drive is switched to two-wheel drive for purposes of preventing tight-corner braking due to the return torque in turning of the vehicle.

In the conventional part-time type four-wheel drive vehicle having a transversal engine, selection between the two-wheel drive and the four-wheel drive is carried out by engaging and releasing an engagement type clutch such as a dog clutch between one side power transmission member for normally transmitting a power to either side of front wheels or rear wheels, or a power transmission member to be driven in receipt of the power from the one side power transmission member and the other side power transmission member for transmitting the power to the other side.

Therefore, the conventional part-time type four-wheel drive vehicle has the following problems in view of selection between the two-wheel drive and the four-wheel drive.

(1) In case of a manual transmission, as the selection between the two-wheel drive and the four-wheel drive during running of the vehicle must be carried out under disengagement of a clutch, it is impossible to effect the selection under a slip condition of wheels.

(2) In a case of an automatic transmission such as planetary gear transmission and a V-belt type CVT, the selection between the two-wheel drive and the four-wheel drive during running of the vehicle must be carried out after setting a transmission range to a neutral condition. Therefore, the selection must be usually carried out during stop of the vehicle.

(3) As operational action of the engagement type clutch is large, it is difficult to carry out electrical or hydraulic operating control without manual operation.

SUMMARY OF THE INVENTION.

Accordingly, it is an object of the present invention to provide a part-time four-wheel drive vehicle having a transversal engine which may easily carry out select control and permit selection between the two-wheel drive and the four-wheel drive to be normally effected during starting of the engine without setting the transmission to a neutral condition.

According to the present invention, there is provided a four-wheel drive vehicle comprising an engine having an output shaft extending in a transverse direction of a vehicular body, a transmission having an input shaft connected to said output shaft of said engine and an output shaft connected through a transmission mechanism to said input shaft in such a manner as to extend in a transverse direction of said vehicular body, a rotating member connected to said output shaft of said transmission, a first output member connected to said rotating member for transmitting a power to a front wheel side or a rear wheel side, and a hydraulic friction clutch for effecting engagement and disengagement between said rotating member and a second output member for transmitting a power to said front wheel side or said rear wheel side.

BRIEF DESCRIPTION OF THE DRAWOMG

DESCRIPTION OF THE PREFERRED EMBODIMENTS

Figure 1:
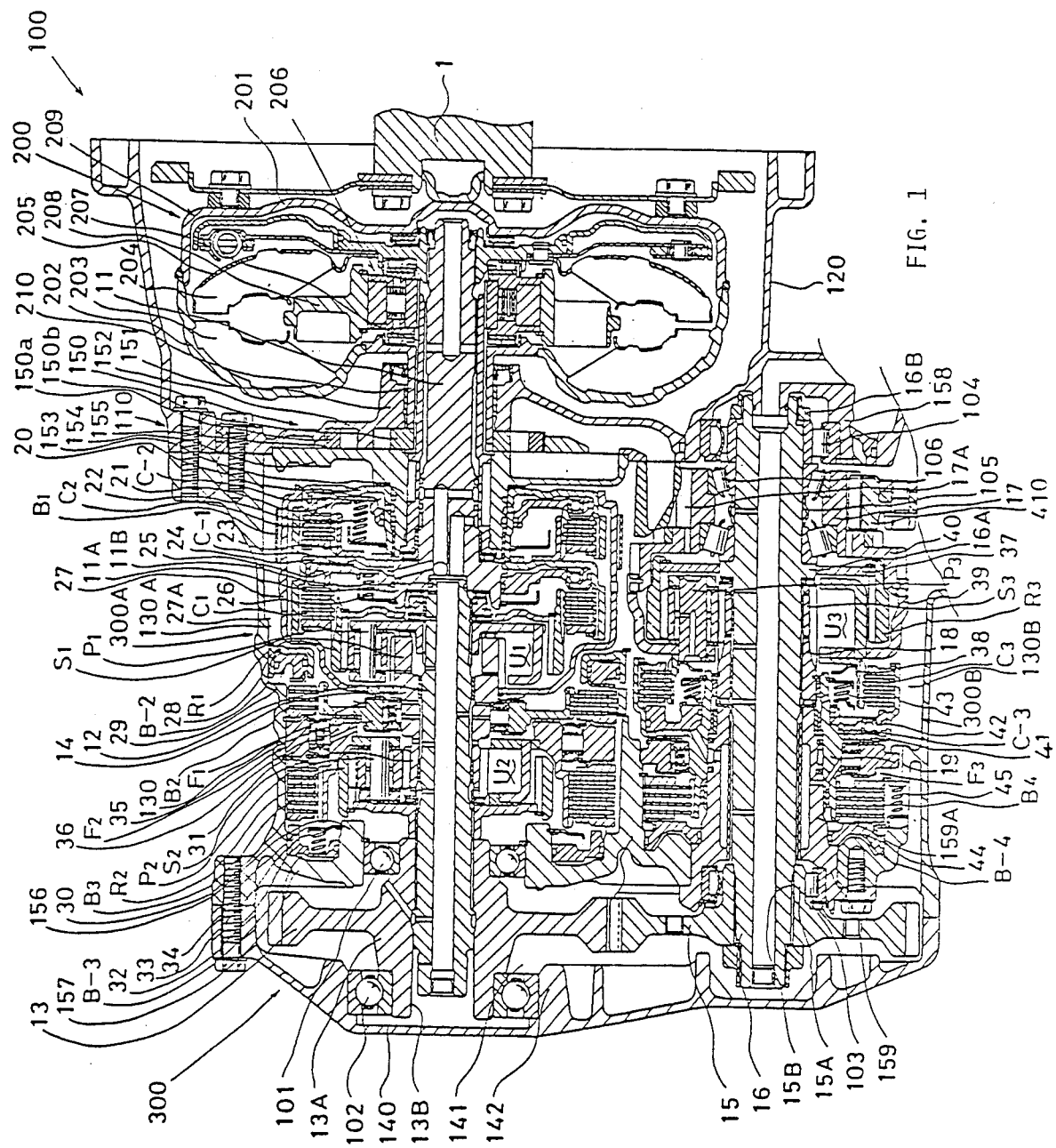
FIGS. 1 and 2 are sectional views of a fluid transmitting device, transmission and transfer of an automatic transmission to be mounted to a transversal engine in a first preferred embodiment of the present invention.
Figure 2:
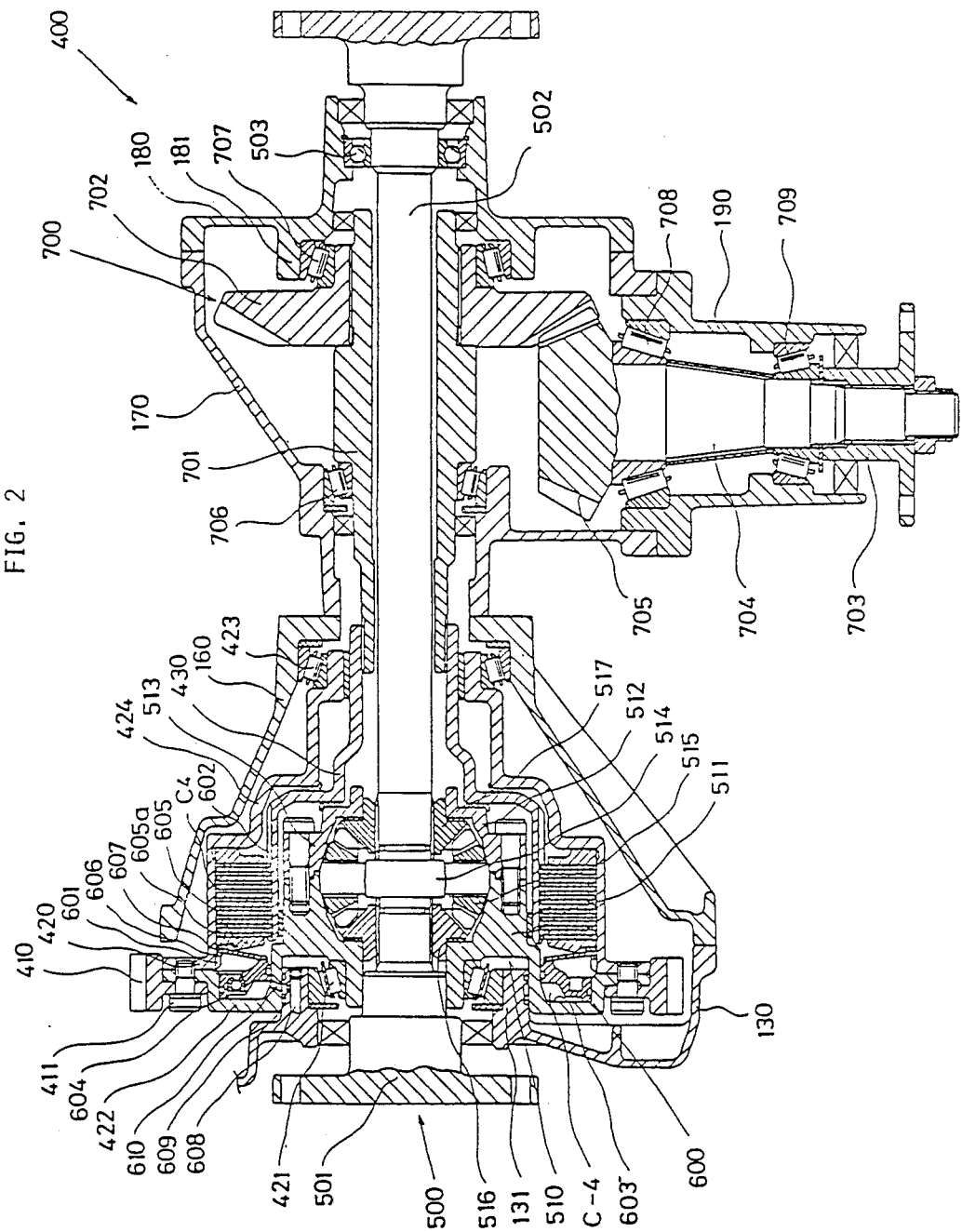

FIGS. 1 and 2 show an automatic transmission in section for four-wheel drive of a front transversal engine part-time type according to a first embodiment of the present invention.

An automatic transmission 100 comprises a fluidic torque converter 200, transmission 300, transfer 400 for four-wheel drive and hydraulic control device (not shown) fixedly provided in an oil pan under the transmission 300.

The transmission 300 comprises an under-drive transmission 300A of three-forward and one-reverse range including a first planetary gear U1, second planetary gear U2, two multi-plate clutches C1 and C2 to be operated by a hydraulic servo, band brake B1, two multi-plate brakes B2 and B3, one-way clutch F1 and one-way brake F2, and an auxillary transmission 300B including a third planetary gear U3, multi-plate clutch C3 to be operated by a hydraulic servo, multi-plate brake B4 and one-way brake F3.

A transmission case 110 of the automatic transmission 100 is constituted of plural separate members which are tightly fixed to each other.

The torque converter 200 is accommodated in a transmission case 120 opened at its right portion (on a right-hand side in the drawing), and is provided with a front cover 201 to be rotated by receiving a drive force of a crank shaft 1 as an output shaft of an engine (not shown), an annular plate-like rear cover 202 welded to an inner circumference of the front cover 201, a pump impeller 203, installed to an inner wall on an inner circumferential surface of the rear cover 202, a turbine runner 204 arranged in opposition to the pump impeller 203, a turbine shell 205 for retaining the turbine runner 204, a stator 208 supported through a one-way clutch 206 to a fixed shaft 207 connected to the transmission case 110 for increasing a torque capacity when an input rotational speed is low, and a direct connecting clutch (lockup clutch) 209 arranged between the front cover 201 and the turbine shell 205 for allowing simultaneous rotation of the front cover 201 and the turbine shell 205. An internal gear oil pump 150 having an external teeth gear 150a and an internal teeth gear 150b therein is provided between a cylindrical transmission case 130 extending at a left portion (on a left-hand side in the drawing) of the torque converter case 120 and the torque converter housing 120. An oil pump body 152 having a cylindrical portion 151 rightwardly projecting at an inner circumference thereof is fixed to a right portion of the transmission case 130 housing the transmission 300. An extension member 210 connected to an inner circumferential end of the rear cover 202 is engaged by spline through an inner circumference of the cylindrical portion 151 with an inner circumference of the external teeth gear 150a. An oil pump cover 154 having a rearwardly projecting cylindrical front support 153 coaxial with the cylindrical portion 151 is fixed to a left portion of the oil pump body 152. Thusly, the oil pump body 152 and the oil pump cover 154 form a partition wall 155 between the torque converter case 120 and the transmission case 130. There are defined an under-drive mechanism chamber 130A housing the under-drive transmission 300A in an upper half space of the transmission case 130 and an auxiliary transmission mechanism chamber 130B housing the auxiliary transmission 300B in a lower half space thereof. At a left portion of the under-drive mechanism chamber 130A, there is provided a fixing member 157 made of aluminium alloy which member having a rightwardly projecting cylindrical center support 156 and supporting an output gear 13, thus defining an output gear housing 141 of the transmission between the fixing member 157 and a rear cover 140 bolted from the left of the transmission case 130. The rear cover 140 is formed with a rightwardly projected cylindrical rear support coaxial with the front support 153.

At a right central portion of the cylindrical auxiliary transmission mechanism chamber 130B provided in parallel relation with the cylindrical under-drive mechanism chamber 130A, a hole-like front support 158 is mounted to the torque converter case 120. At a left portion of the auxiliary transmission mechanism chamber 130B, a fixing member 159 having a rightwardly projecting cylindrical inner member 159A is fixed to the transmission case 130 by a bolt.

The fixed shaft 207 of the one-way clutch 206 for supporting the stator 208 of the torque converter 200 is fitted inside of the front support 153, and an input shaft 11 of the transmission 300 as an output shaft of the torque converter 200 is rotatably supported inside of the fixed shaft 207. The input shaft 11 is formed with a large diametrical left end portion 11A leftwardly projecting from the front support 153, and the left end portion 11A is formed with a leftward hole 11B at a center thereof. A first intermediate transmitting shaft 12 arranged in a serial manner with respect to the input shaft 11 is rotatably mounted to a left portion of the input shaft 11. The first intermediate transmitting shaft 12 is in sliding contact with the hole 10B at a right end portion thereof, and is engaged by spline with an inner hole 13B of a central cylindrical portion 13A of the output gear 13 at a left end thereof. The cylindrical portion 13A of the output gear 13 is supported by ball bearings 101 and 102 for allowing smooth rotation of the output gear 13 which bearings are provided between the center support 156 and the rear support 142 of the fixing member 157 and the cylindrical portion 13A of the output gear 13. A sun gear shaft 14 is rotatably engaged through a bearing with an outside of a right end of the first intermediate transmitting shaft 12.

An input gear 15 of the auxiliary transmission 300B to be meshed with the output gear 13 is supported through a roller bearing 103 to the inner member 159A at a central cylindrical portion 15A thereof. A second intermediate transmitting shaft 16 centrally passing through the auxiliary transmission mechanism chamber 130B is engaged by spline at a left end portion thereof with the inner hole 15B. The second intermediate transmitting shaft 16 is formed with a flange-like projection 16A at an intermediate portion thereof, and is rotatably supported through a roller bearing 104 to the hole-like front support 158 at a right end portion thereof. There is formed between the roller bearing 104 and the flange-like projection 16A on the second intermediate transmitting shaft 16 an output gear 17A of a double-shaft automatic transmission (a multi-range transmission comprising the under-drive transmission 300A and the auxiliary transmission 300B) through a pair of tapered roller bearings 106 installed under adjusted prepressure with a spring member 105 interposed and a nut 16B fastened at one end, and an output shaft 17 of the transmission 300 is supported. An output gear 17A of the output shaft 17 is meshed with a drive gear wheel 501 of the transfer 400.

A cylindrical sun gear shaft 18 is rotatably supported through a bushing between the flange-like projection 16A on the second intermediate transmitting shaft 16 and the inner member 159A. A cylindrical outer member 19 is rotatably supported through a bushing on the outside of the inner member 159A. An outside of a left end of the sun gear shft 18 is engaged by spline with an inside of a right end of the outer member 19.

In the under-drive mechanism chamber 130A, at the right side thereof, a first hydraulic servo drum 20 opened at its left portion is rotatably engaged with the front support 153, and an annular piston 21 is fitted between inner and outer circumferential walls thereof to form a hydraulic servo C-2 of the clutch C2. A return spring 22 is mounted to the inner wall side of the servo drum, while the clutch C2 is mounted to the inside of the outer wall thereof. On the left side of the first hydraulic servo drum 20, a second hydraulic servo drum 24 opened at its left portion and having an annular projection 23 at its right portion is fixed to the left end portion 11A of the input shaft 11, and an annular piston 25 is fitted between the left end portion 11A and an outer wall of the servo drum to form a hydraulic servo C-1 of the clutch C1. A return spring 26 is mounted on the inner circumferential side of the servo drum, while the clutch C1 is mounted to the inside of the outer wall thereof. Further, the clutch C2 is mounted to the outer circumference of the annular projection 23, and both the first and second hydraulic servo drums 20 and 24 are connected through the clutch C2 with each other. On the left side of the second hydraulic servo drum 24, the first planetary gear U1 is provided, and a ring gear R1 is connected through the clutch C1 to the second hydraulic servo drum 24. A carrier P1 is engaged by spline with a right end portion of the first intermediate transmitting shaft 12, and a sun gear S1 is integrally formed with the sun gear shaft 14. A connecting drum 27 so molded as to cover the first and second hydraulic servo drums 20 and 24 and the first planetary gear U1 in a minimum space is fixed to the outside of the first hydraulic servo drum 20 at a right end thereof, and is connected to the sun gear shaft 14 at a left end thereof on the left side of the first planetary gear U1. Further, the band brake B1 is provided on the outer circumferential side of the servo drum.

In an excess space 27A outside of the connecting drum 27 outside of the first planetary gear U1, an annular third hydraulic servo drum 28 opened at its left portion is fixed, and a piston 29 is fitted to form a hydraulic servo B-2 of the brake B2. The brake B2, an outer race 31 of the one-way brake F2 and the multi-plate brake B3 are engaged in this order from the right with a spline groove 30 formed on the inside of the transmission case 130 on the left side of the hydraulic servo B-2. A piston 32 is fitted in an annular hole defined between the outer circumference of the center support 156 of the fixing member 157 and the torque converter 200 to form a hydraulic servo B-3 of the mutli-plate brake B3. A return spring 33 of the hydraulic servo B-3 is supported by a flange plate 34 mounted at the right end of the center support 156. The one-way clutch F1 including the sun gear shaft 14 as an inner race is provided inside of the multi-plate brake B2, and an outer race 35 is connected with an inner circumference of the multi-plate brake B2. The second planetary gear U2 is provided on the left side of the one-way clutch F1. In the second planetary gear U2, a sun gear S2 is integrally formed with the sun gear shaft 14. A carrier P2 is connected with an inner race 35A of the one-way brake F2 and with the multi-plate brake B3. A ring gear R2 is connected with the first intermediate transmitting shaft 12.

In the third planetary gear U3 provided on the left side of the output shaft 17, a ring gear R3 is connected through a flange plate 37 to the projection 16A of the second intermediate transmitting shaft 16. A carrier P3 is connected through an output drum 39 having an annular projection 38 to be connected with the clutch C3 to a connecting sleeve 40 as an input section. A sun gear S3 is formed on a sun gear shaft 18. On the left side of the third planetary gear U3, a fourth hydraulic servo drum 41 opened at its right portion is fixed to the outer member 19 rotatably mounted through a bearing to the outer circumference of the inner member 159A of the fixing member 159. An annular piston 42 is fitted between an outer wall of the servo drum 41 and the outer member 19 to form a hydraulic servo C-3 of the clutch C3. A return spring 43 is installed on the outer member 19 side, and the clutch C3 is mounted inside of the outer wall. The servo drum 41 is connected through the clutch C3 to the carrier P3. The one-way brake F3 including an inner race of the outer member 19 is provided on the left side of the fourth hydraulic servo drum 41. On the left side of the servo drum, the brake B4 is provided between the outer member 19 and the transmission case 130. A piston 44 is fitted between the outer circumference of the inner member 159A of the fixing member 159 and the transmission case 130 to form a hydraulic servo B-4 of the brake B4. A return spring 45 is fitted in a groove formed on the outer circumferential side of the brake B4. The outer member 19 is rotated by receiving power through the carrier P3 of the third planetary gear U3, the output drum 39 and the clutch C3.

The transmission 300 is designed to effect engagement or release of each clutch and brake by hydraulic pressure selectively outputted from the hydraulic control device (not shown) to each hydraulic servo of frictional engagement devices according to running conditions of a vehicle such as a vehicular speed and a throttle opening degree, thereby obtaining four forward ranges and one reverse range. There will be shown in Table 1 an example of operation and transmission range of each clutch, brake, one-way clutch and one-way brake.

(TABLE 1)

| RANGE | CLUTCH | | | BRAKE | | | | OWC | | |
|---|---|---|---|---|---|---|---|---|---|---|
| | $C_1$ | $C_2$ | $C_3$ | $B_1$ | $B_2$ | $B_3$ | $B_4$ | $F_1$ | $F_2$ | $F_3$ |
| P | X | X | X | X | X | X | E | f | f | f |
| R | X | E | X | X | X | E | E | f | f | f |
| N | X | X | X | X | X | X | E | f | f | f |
| D | | | | | | | | | | |
| 1 | E | X | X | X | X | X | E | f | L | (L) |
| 2 | E | X | X | X | E | X | E | L | f | (L) |
| 3 | E | E | X | X | E | X | E | f | f | (L) |
| 4 | E | E | E | X | E | X | X | f | f | f |
| S | | | | | | | | | | |
| 1 | E | X | X | X | X | X | E | f | L | (L) |
| 2 | E | X | X | E | E | X | E | (L) | f | (L) |
| 3 | E | E | X | X | E | X | E | f | f | (L) |
| (3) | E | E | X | X | E | X | E | f | f | (L) |
| L | | | | | | | | | | |
| 1 | E | X | X | X | X | E | E | f | (L) | (L) |
| 2 | E | X | X | E | E | X | E | (L) | f | (L) |
| (1) | E | X | X | X | X | E | E | f | (L) | (L) |

In Table 1, E represents that the corresponding clutch and brake are engaged, and X represents that the corresponding clutch and brake are released. L represents that the corresponding one-way clutch is engaged under engine drive condition, but such engagement is not necessarily needed because of the fact that power transmission is ensured by the clutch or brake arranged in parallel to the one-way clutch (Lock condition). (L) represents that the corresponding one-way clutch is engaged only under engine drive condition, but is not engaged under engine brake condition. Further, f represents that the corresponding one-way clutch is free.

The transfer 400 comprises a drive gear wheel 410 meshing with the output gear 17A of the output shaft 17 of the transmission 300 and receiving power from the output shaft 17, a differential gear case 420 fastened to the drive gear wheel 410 by a bolt 411 and having a bevel gear type front differential gear 510 of a front wheel transmission mechanism 500 for driving front wheels and a hydraulic clutch mechanism 600 for selecting front-wheel drive and four-wheel drive, which mechanism acts to transmit and cut off power to a rear wheel side output member 430 for converting a rotating direction and transmitting power to a rear wheel side, and rear wheel propeller mechanism 700 connected by spline with the rear wheel side output member 430 for transmitting power to the rear wheel side.

The differential gear case 420 comprises a left case 422 rotatably supported through a tapered roller bearing 421 on an inner circumference of a rightwardly projecting sleeve-like portion 131 coaxial with the front wheel transmitting mechanism 500 of the transmission case 130, and a right case 424 rotatably supported through a tapered roller bearing 423 on an inner circumference of a transfer case 160 housing a right portion of the differential gear case 420 fixed to the right portion of the transmission case 130. The differential gear case 420 is fastened by the bolt 411 together with the drive gear wheel 410.

The front wheel transmitting mechanism 500 includes a front differential gear 510 comprising a front differential case 513 composed of a left differential case 511 integrally formed with the left differential case 422 of the differential gear case 420 and a right differential case 512 bolted to the left differential case 511, a differential pinion shaft 514 supported to the front differential case 513, a differential pinion 515 rotatably supported to the differential pinion shaft 514, a differential left side gear 516 meshed with the differential pinion 515 at the left and a differential right side gear 517 meshed with the differential pinion 515 at the right. A front left wheel propeller shaft 501 for transmitting power to a front left wheel is connected by spline with an inner circumference of the differential left side gear 516, while a front right wheel propeller shaft 502 for transmitting power to a front right wheel is connected by spline with an inner circumference of the differential right side gear 517.

The hydraulic clutch mechanism 600 comprises a multi-plate clutch C4 meshed with an inner spline 601 formed at an inner position of the front differential gear 510 of the right case 424 of the differential gear case 420 and with an outer spline 602 formed at a position of the rear wheel side output member 430 corresponding to the inner position of the inner spline 601, a piston 604 air-tightly fitted in an annular hole 603 defined at a position of the left case 422 on the transmission 300 side of the multi-plate clutch C4 so as to urge the multi-plate clutch C4, a hydraulic servo C-4 provided between the annular hole 603 and the piston 604 for driving the piston 604 by supplying and discharging a hydraulic oil, a clutch push plate 605 provided between the multi-plate clutch C4 and the piston 604 and having a fulcrum 605a projecting to the piston 604 side, and a lever type return spring 607 abutting against the piston 604 at its inner position, abutting against the fulcrum 605a of the clutch push plate 605 at its intermediate outer position, and being stopped by a snap ring 606 at its outer position. Supply/discharge control of the hydraulic oil to the hydraulic servo C-4 is effected by a hydraulic control device provided at a lower portion of the transmission 300. A hydraulic oil supply means for supplying the hydraulic oil from the hydraulic control device to the hydraulic servo C-4 is formed by an oil passage (not shown) in the transmission case 130 from the hydraulic control device, an oil passage 608 in the sleeve-like portion 131 from the oil passage in the transmission case 130, an oil passage 609 in the sleeve-like portion 131 for communicating the oil passage 608 with an outer circumference of the sleeve-like portion 131, and an oil passage 610 in the left case 422 for communicating the oil passage 609 with the hydraulic servo C-4. The multi-plate clutch C4 is engaged by supplying the hydraulic oil to the hydraulic servo C-4 thereby to transmit an output of the output shaft 17 of the transmission 300 through the drive gear wheel 410, the differential gear case 420 and the multi-plate clutch C4 to the rear wheel side output member 430. Such engagement of the multi-plate clutch C4 is released by discharging the hydraulic oil of the hydraulic servo C-4, and the power transmitted to the right case 424 is not transmitted to the rear wheel side output member 430.

The rear wheel propeller mechanism 700 comprises a gear wheel shaft 701 having a front right wheel propeller shaft 502 of the front wheel transmitting mechanism 500 on its inner circumference and connected by spline at the left end of its outer circumference with the right end of the inner circumference of the rear wheel side output member 430, a gear wheel 702 engaged by spline with the outer circumference of the right portion of the gear wheel shaft 701, and a pinion 705 meshed with the gear wheel 702 and integrally formed with a rear wheel propeller shaft 704 connected by spline with the outer circumference of a rear portion of a sleeve yoke 703 for transmitting power to the rear wheel side. The gear wheel shaft 701 is rotatably supported at its intermediate portion through a tapered roller bearing 706 to the inner circumference of a gear wheel case 170 fixed to the right side of the transfer case 160. A propeller shaft support case 180 is designed to rotatably support the front right wheel propeller shaft 502 fastened through a ball bearing 503 to the right side of the gear wheel case 170. The gear wheel shaft 701 is rotatably supported at its right portion through a tapered roller bearing 707 and the gear wheel 702. The tapered roller bearing 707 is provided on the inner circumference of a cylindrical boss portion 181 of the support case 180 which is leftwardly projected and is coaxial with the front right wheel propeller shaft 502. The rear wheel propeller shaft 704 is rotatably supported through tapered roller bearings 708 and 709 to the inner circumference of a pinion case 190 fastened to the rear portion of the gear wheel case 170. Thus, the power transmitted to the rear wheel side output member 430 is transmitted through the gear wheel shaft 701, gear wheel 702, pinion 705, rear wheel propeller shaft 704 and sleeve yoke 703 to a rear drive wheel side.

As is mentioned above, a friction area of the multi-plate clutch is enlarged by providing the same at the outer circumferential position of the differential gear, thereby increasing a clutch capacity and allowing suitable application to a vehicle having a large cylinder capacity. Further, an axial dimension of the transfer may be shortened by providing the multi-plate clutch at the outer circumferential position of the differential gear. Since the hydraulic friction clutch is provided in the differential gear case, the transfer may be made compact thereby to improve installation of the same in a vehicle (hydraulic servo) of the hydraulic friction clutch is provided on the hydraulic control device side of the friction engagement member (multi-plate clutch), the oil passages for supplying/discharging the hydraulic oil may be shortened thereby to simplify the hydraulic oil supply means. Furthermore, as the lever type return spring is used for the friction engagement means, a large engagement torque capacity may be obtained in a small space.

Figure 3:
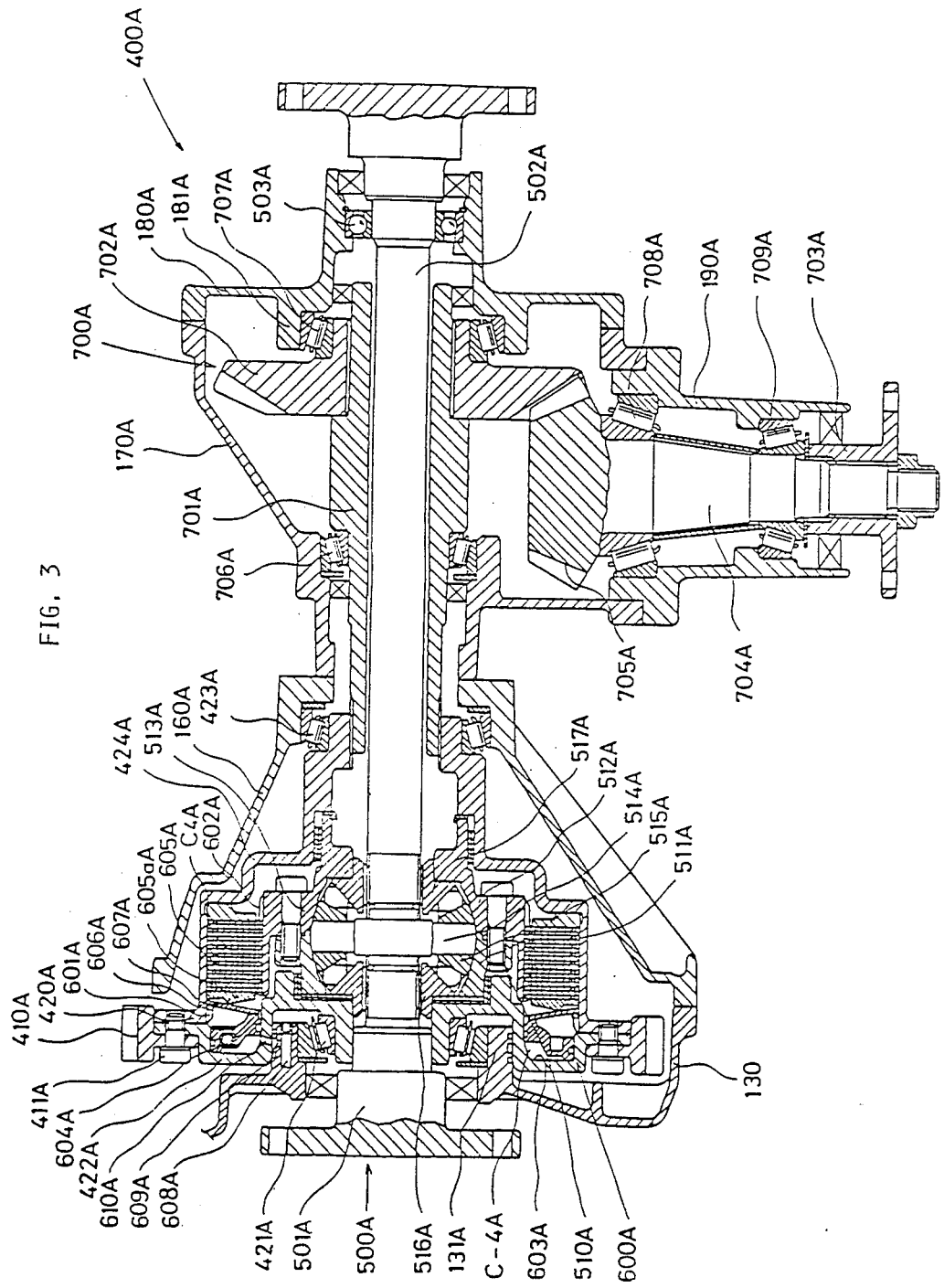
FIG. 3 is a sectional view of a transfer in a second preferred embodiment of the present invention.

FIG. 3 is a sectional view of a transfer of the automatic transmission in a second preferred embodiment of the present invention.

The transfer 400A comprises a drive gear wheel 410A meshing with the output gear 17A of the output shaft 17 of the transmission 300 and receiving power from the output shaft 17, a differential gear case 420A fastened to the drive gear wheel 410A by a bolt 411A and having a bevel gear type front differential gear 510A of a front wheel transmission mechanism 500A for driving front wheels and a hydraulic clutch mechanism 600A for selecting rear-wheel drive and four-wheel drive, which mechanism acts to transmit and cut off power to a front wheel side, and rear-wheel propeller mechanism 700A connected by spline with the differential gear case 420A.

The differential gear case 420A comprises a left case 422A rotatably supported through a tapered roller bearing 421A on an inner circumference of a rightwardly projecting sleeve-like portion 131A coaxial with the front wheel transmitting mechanism 500A of the transmission case 130, and a right case 424A rotatably supported through a tapered roller bearing 423A on an inner circumference of a transfer case 160A housing a right portion of the differential gear case 420A fixed to the right portion of the transmission case 130. The differential gear case 420A is fastened by the bolt 411A together with the drive gear wheel 410A.

The front wheel transmitting mechanism 500A includes a front differential gear 510A comprising a front differential case 513A composed of a left differential case 511A rotatably arranged in the differential gear case 420A and a right differential case 512A bolted to the left differential case 511A as a front wheel side output member receiving a power from the differential case 420A through the hydraulic clutch mechanism 600A, a differential pinion shaft 514A supported to the front differential case 513A, a differential pinion 515A rotatably supported to the differential pinion shaft 514A, a differential left side gear 516A meshed with the differential pinion 515A at the left and a differential right side gear 517A meshed with the differential pinion 515A at the right. A front left wheel propeller shaft 501A for transmitting power to a front left wheel is connected by spline with an inner circumference of the differential left side gear 516A, while a front right wheel propeller shaft 502A for transmitting power to a front right wheel is connected by spline with an inner circumference of the differential right side gear 517A.

The hydraulic clutch mechanism 600A comprises a multi-plate clutch C4A meshed with an inner spline 601A formed at an inner position of the front differential gear 510A of the right case 424A of the differential gear case 420A and with an outer spline 602A formed at a position of the rear wheel side output member 430A corresponding to the inner position of the inner spline 601A formed on an outer circumference of the right differential case 512A, a piston 604A air-tightly fitted in an annular hole 603A defined at a position of the left case 422A on the transmission 300 side of the multi-plate clutch C4A so as to urge the multi-plate clutch C4A, a hydraulic servo C-4A provided between the annular hole 603A and the piston 604A for driving the piston 604A by supplying and discharging a hydraulic oil, a clutch push plate 605A provided between the multi-plate clutch C4A and the piston 604A and having a fulcrum 605aA projecting to the piston 604A side, and a lever type return spring 607A abutting against the piston 604A at its inner position, abutting against the fulcrum 605aA of the clutch push plate 605A at its intermediate outer position, and being stopped by a snap ring 606A at its outer position. Supply/discharge control of the hydraulic oil to the hydraulic servo C-4A is effected by a hydraulic control device provided at a lower portion of the transmission 300. A hydraulic oil supply means for supplying the hydraulic oil from the hydraulic control device to the hydraulic servo C-4A is formed by an oil passage (not shown) in the transmission case 130 from the hydraulic control device, an oil passage 608A in the sleeve-like portion 131A from the oil passage in the transmission case 130, an oil passage 609A in the sleeve-like portion 131A for communicating the oil passage 608A with an outer circumference of the sleeve-like portion 131A, and an oil passage 610A in the left case 422A for communicating the oil passage 609A with the hydraulic servo C-4A. The multi-plate clutch C4A is engaged by supplying the hydraulic oil to the hydraulic servo C-4A thereby to transmit an output of the output shaft 17 of the transmission 300 through the drive gear wheel 410A, the differential gear case 420A and the multi-plate clutch C4A to the right differential case 512A of the front differential case 513A. Such engagement of the multi-plate clutch C4A is released by discharging the hydraulic oil of the hydraulic servo C-4A, and the power transmitted to the right case 424A is not transmitted to the rear wheel side output member 430A.

The rear wheel propeller mechanism 700A comprises a gear wheel shaft 701A as a rear wheel side output member having a front right wheel propeller shaft 502A of the front wheel transmitting mechanism 500A on its inner circumference and connected by spline at the left end of its outer circumference with the right end of the inner circumference of the differential gear case 420A, a gear wheel 702A engaged by spline with the outer circumference of the right portion of the gear wheel shaft 701A, and a pinion 705A meshed with the gear wheel 702A and integrally formed with a rear wheel propeller shaft 704A connected by spline with the outer circumference of a rear portion of a sleeve yoke 703A for transmitting power to the rear wheel side. The gear wheel shaft 701A is rotatably supported at its intermediate portion through a tapered roller bearing 706A to the inner circumference of a gear wheel case 170A fixed to the right side of the transfer case 160A. A propeller shaft support case 180A is designed to rotatably support the front right wheel propeller shaft 502A fastened through a ball bearing 503A to the right side of the gear wheel case 170A. The gear wheel shaft 701A is rotatably supported at its right portion through a tapered roller bearing 707A and the gear wheel 702A. The tapered roller bearing 707A is provided on the inner circumference of a cylindrical boss portion 181A of the support case 180A which is leftwardly projected and is coaxial with the front right wheel propeller shaft 502A. The rear wheel propeller shaft 704A is rotatably supported through tapered roller bearings 708A and 709A to the inner circumference of a pinion case 190A fastened to the rear portion of the gear wheel case 170A. Thus, the power normally transmitted to the differential gear case 420A is transmitted through the gear wheel shaft 701A, gear wheel 702A, pinion 705A, rear wheel propeller shaft 704A and sleeve yoke 703A to a rear drive wheel side.

Figure 4:
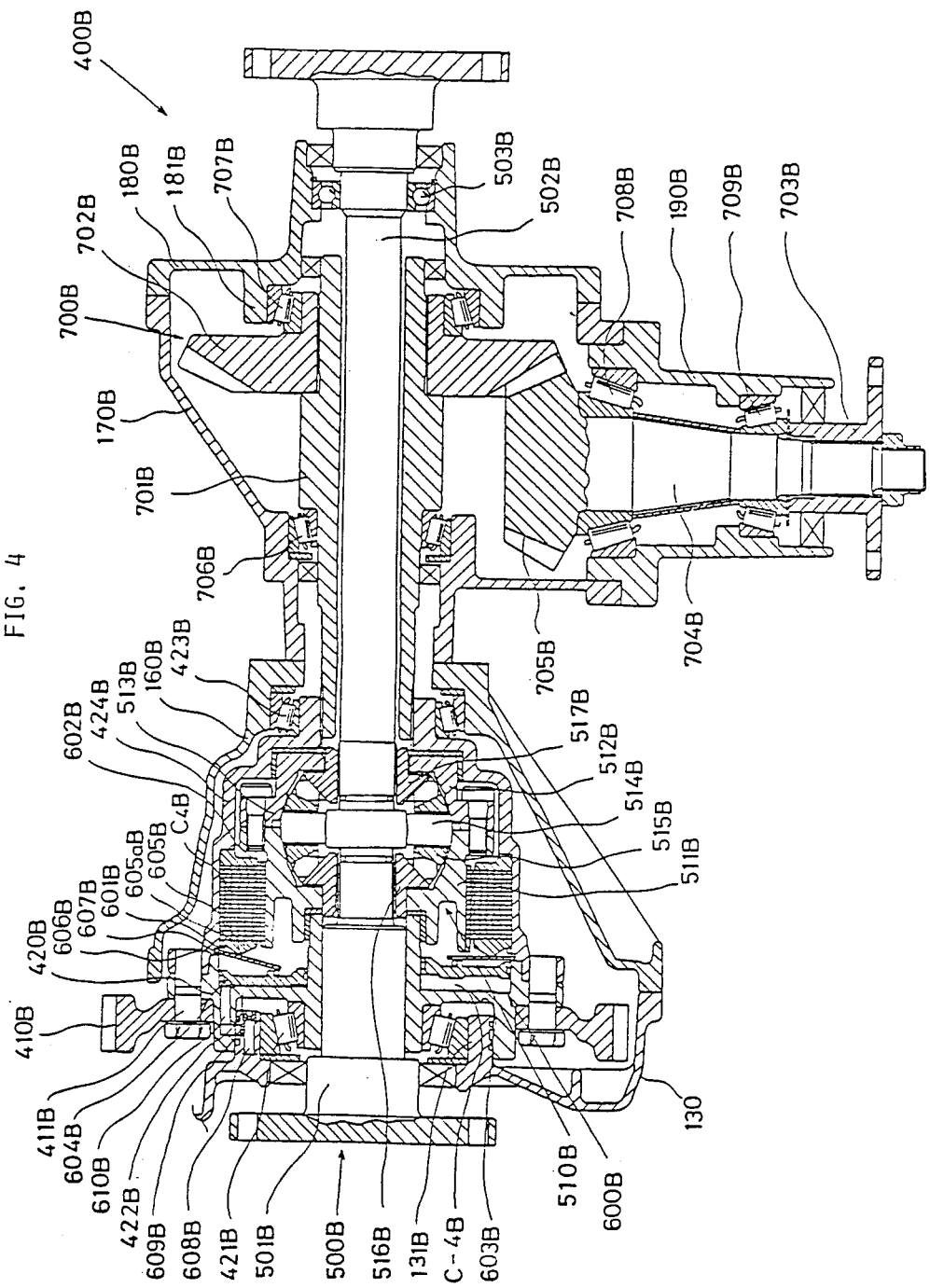
FIG. 4 is a sectional view of a transfer in a third preferred embodiment of the present invention.

FIG. 4 is a sectional view of a transfer of the automatic transmission in a third preferred embodiment of the present invention.

The transfer 400B comprises a drive gear wheel 410B meshing with the output gear 17A of the output shaft 17 of the transmission 300 and receiving power from the output shaft 17, a differential gear case 420B fastened to the drive gear wheel 410B by a bolt 411B and having a bevel gear type front differential gear 510B of a front wheel transmission mechanism 500B for driving front wheels and a hydraulic clutch mechanism 600B for selecting rear-wheel drive and four-wheel drive, which mechanism acts to transmit and cut off power to a front wheel side, and rear wheel propeller mechanism 700B connected by spline with the differential gear case 420B.

The differential gear case 420B comprises a left case 422B rotatably supported through a tapered roller bearing 421B on an inner circumference of a rightwardly projecting sleeve-like portion 131B coaxial with the front wheel transmitting mechanism 500B of the transmission case 130, and a right case 424B rotatably supported through a tapered roller bearing 423B on an inner circumference of a transfer case 160B housing a right portion of the differential gear case 420B fixed to the right portion of the transmission case 130. The differential gear case 420B is fastened by the bolt 411B together with the drive gear wheel 410B.

The front wheel transmitting mechanism 500B includes a front differential gear 510B comprising a front differential case 513B composed of a left differential case 511B as a front wheel side output member receiving a power from the differential gear case 420B through the hydraulic clutch mechanism 600B, rotatably arranged in the differential gear case 420B and a right differential case 512B bolted to the left differential case 511B, a differential pinion shaft 514B supported to the front differential case 513B, a differential pinion 515B rotatably supported to the differential pinion shaft 514B, a differential left side gear 516B meshed with the differential pinion 515B at the left and a differential right side gear 517B meshed with the differential pinion 515B at the right. A front left wheel propeller shaft 501B for transmitting power to a front left wheel is connected by spline with an inner circumference of the differential left side gear 516B, while a front right wheel propeller shaft 502B for transmitting power to a front right wheel is connected by spline with an inner circumference of the differential right side gear 517B.

The hydraulic clutch mechanism 600B comprises a multi-plate clutch C4B meshed with an inner spline 601B formed on an inner circumference of a side position, that is, on the transmission 300 side, of the front differential gear 510B of the right case 424B of the differential gear case 420B and with an outer spline 602B formed at a position of the rear wheel side output member 430B corresponding to the inner position of the inner spline 601B, a piston 604B air-tightly fitted in an annular hole 603B defined at a position of the left case 422B on the transmission 300 side of the multi-plate clutch C4B so as to urge the multi-plate clutch C4B, a hydraulic servo C-4B provided between the annular hole 603B and the piston 604B for driving the piston 604B by supplying and discharging a hydraulic oil, a clutch push plate 605B provided between the multi-plate clutch C4B and the piston 604B and having a fulcrum 605aB projecting to the piston 604B side, and a lever type return spring 607B abutting against the piston 604B at its inner position, abutting against the fulcrum 605aB of the clutch push plate 605B at its intermediate outer position, and being stopped by an outer circumferential groove 606B formed on an inner circumference of a connected portion between the left case 422B and the right case 424B. Supply/discharge control of the hydraulic oil to the hydraulic servo C-4B is effected by a hydraulic control device provided at a lower portion of the transmission 300. A hydraulic oil supply means for supplying the hydraulic oil from the hydraulic control device to the hydraulic servo C-4B is formed by an oil passage (not shown) in the transmission case 130 from the hydraulic control device, an oil passage 608B in the sleeve-like portion 131B from the oil passage in the transmission case 130, an oil passage 609B in the sleeve-like portion 131B for communicating the oil passage 608B with an outer circumference of the sleeve-like portion 131B, and an oil passage 610B in the left case 422B for communicating the oil passage 609B with the hydraulic servo C-4B. The multi-plate clutch C4B is engaged by supplying the hydraulic oil to the hydraulic servo C-4B thereby to transmit an output of the output shaft 17 of the transmission 300 through the drive gear wheel 410B, the differential gear case 420B and the multi-plate clutch C4B to the rear wheel side output member 430B. Such engagement of the multi-plate clutch C4B is released by discharging the hydraulic oil of the hydraulic servo C-4B, and the power transmitted to the right case 424B is not transmitted to the left differential case 511B of the front differential case 513B.

The rear wheel propeller mechanism 700B comprises a gear wheel shaft 701B as a rear wheel side output member having a front right wheel propeller shaft 502B of the front wheel transmitting mechanism 500B on its inner circumference and connected by spline at the left end of its outer circumference with the right end of the inner circumference of the differential gear case 420B, a gear wheel 702B engaged by spline with the outer circumference of the right portion of the gear wheel shaft 701B, and a pinion 705B meshed with the gear wheel 702B and integrally formed with a rear wheel propeller shaft 704B connected by spline with the outer circumference of a rear portion of a sleeve yoke 703B for transmitting power to the rear wheel side. The gear wheel shaft 701B is rotatably supported at its intermediate portion through a tapered roller bearing 706B to the inner circumference of a gear wheel case 170B fixed to the right side of the transfer case 160B. A propeller shaft support case 180B is designed to rotatably support the front right wheel propeller shaft 502B fastened through a ball bearing 503B to the right side of the gear wheel case 170B. The gear wheel shaft 701B is rotatably supported at its right portion through a tapered roller bearing 707B and the gear wheel 702B. The tapered roller bearing 707B is provided on the inner circumference of a cylindrical boss portion 181B of the support case 180B which is leftwardly projected and is coaxial with the front right wheel propeller shaft 502B. The rear wheel propeller shaft 704B is rotatably supported through tapered roller bearings 708B and 709B to the inner circumference of a pinion case 190B fastened to the rear portion of the gear wheel case 170B. Thus, the power normally transmitted to the differential gear case 420B is transmitted through the gear wheel shaft 701B, gear wheel 702B, pinion 705B, rear wheel propeller shaft 704B and sleeve yoke 703B to a rear drive wheel side.

According to the above-mentioned embodiments, as the multi-plate clutch is provided on a side position of the differential gear, a distance among the output shaft of the transmission, the output shaft of the engine and the output shaft of the differential gear (the front left wheel propeller shaft 501B and the front right wheel propeller shaft 502B in the preferred embodiment) may be reduced thereby to make the transfer compact and improve installability to the vehicle.

Figure 5:
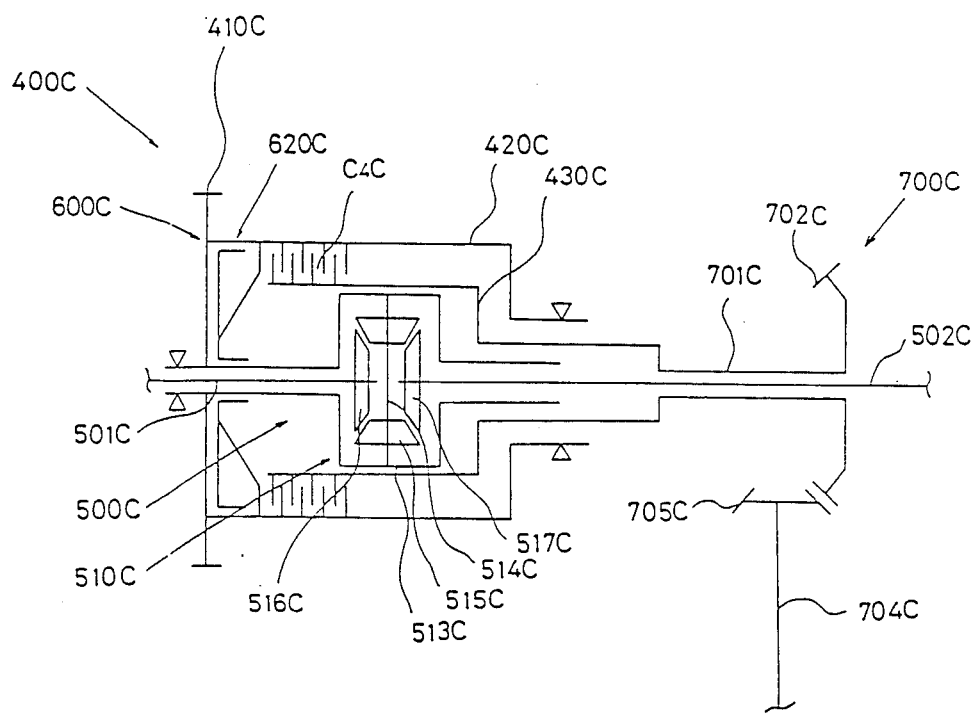
FIG. 5 is a schematic illustration of a transfer in a fourth preferred embodiment of the present invention.

FIG. 5 is a schematic illustration of a transfer in a fourth preferred embodiment of the present invention.

The transfer 400C comprises a drive gear wheel 410C meshing with the output gear 17A of the output shaft 17 of the transmission 300 and receiving power from the output shaft 17, a differential gear case 420C connected to the drive gear wheel 410C by a bolt 411C and having a bevel gear type front differential gear 510C of a front wheel transmission mechanism 500C for driving front wheels and a hydraulic clutch mechanism 600C for selecting two-wheel drive and four-wheel drive, which mechanism acts to transmit and cut off power to a rear wheel side output member 430C for transmitting power to a rear wheel side, and rear wheel propeller mechanism 700C connected with the rear wheel side output member 430C for transmitting power to the rear wheel side.

The front wheel transmitting mechanism 500C includes a front differential gear 510C comprising a front differential case 513C composed of a left differential case 511C connected to the differential gear case 420C and a right differential case 512C bolted to the left differential case 511C, a differential pinion shaft 514C supported to the front differential case 513C, a differential pinion 515C rotatably supported to the differential pinion shaft 514C, a differential left side gear 516C meshed with the differential pinion 515C at the left and a differential right side gear 517C meshed with the differential pinion 515C at the right. A front left wheel propeller shaft 501C for transmitting power to a front left wheel is connected with an inner circumference of the differential left side gear 516C, while a front right wheel propeller shaft 502C for transmitting power to a front right wheel is connected with an inner circumference of the differential right side gear 517C.

The hydraulic clutch mechanism 600C comprises a multi-plate clutch C4C meshed with a side position, that is, the transmission 3003 side of the front differential gear 510C of the differential gear case 420C and with an outer circumference of the rear wheel side output member 430C on the transmission side from the front differential gear 510C, and a push means 620C provided in the differential gear case 420C on the transmission 300 side of the multi-plate clutch C4C for engaging and disengaging the multi-plate clutch C4C. An output from the output shaft 17 of the transmission 300 is transmitted through the drive gear wheel 410C, the differential gear case 420C and the multi-plate clutch C4C to the rear wheel side output member 430C by driving the push means 620C and thereby engaging the multi-plate clutch C4C, and a power transmitted to the differential gear case 420C is not transmitted to the rear wheel side output member 430C by disengaging the multi-plate clutch C4C.

The rear wheel propeller mechanism 700C comprises a gear wheel shaft 701C having a front right wheel propeller shaft 502C of the front wheel transmitting mechanism 500C on its inner circumference and connected to the rear wheel side output member 430C, a gear wheel 702C provided at the right end of the gear wheel shaft 701C, and a pinion 705C meshed with the gear wheel 702C and connected to a rear wheel propeller shaft 704C for transmitting a power to the rear wheel side. The power transmitted to the rear wheel side output member 430C is transmitted through the gear wheel shaft 701C, the gear wheel 702C, the pinion 705C and the rear wheel propeller shaft 704C to a rear drive wheel side.

The present disclosure relates to subject matter contained in Japanese Patent Application No. 267784/1984 (filed Dec. 19th, 1984) which is incorporated herein by reference.

It will be understood that the above description of the present invention is susceptible to various modifications, changes and adaptations, and the same are intended to be comprehended within the meaning and range of equivalents of the appended claims.

What is claimed is:

1. A four-wheel drive vehicle comprising:
    a front wheel side having a front wheel set,
    a rear wheel side having a rear wheel set,
    an engine having an output shaft extending in a transverse direction of a vehicular body,
    a transmission having an input shaft connected to the output shaft of the engine and an output shaft connected through a transmission mechanism to the input shaft such as to extend in a transverse direction of the vehicular body,
    a rotating member connected to the output shaft of the transmission, said rotating member being a front differential gear case incorporating a front differential gear for one of said wheel sets,
    a first output member connected between the rotating member and one of the wheel sets for transmitting power to one of the wheel sets through said front differential gear,
    a second output member coaxial with the first output member,
    a rear wheel propeller mechanism between the second output member and the other wheel set, and operative to convert the rotation of the second output member into rotation about an axis perpendicular to the axis of rotation of the second output member for driving the other wheel set, and
    a hydraulic friction clutch provided coaxially with the first and second output members to selectively connect the rotating member and the second output member, said hydraulic friction clutch being arranged in an inner circumferential position of the front differential gear case.

2. The four-wheel drive vehicle as defined in claim 1, wherein
    said hydraulic friction clutch comprises:
    a plurality of clutch plates splined on the inner periphery of the front differential gear case and an outer periphery of the second output member,
    a piston slidably fitted in an annular hole of the front differential gear case,
    a hydraulic chamber provided in said annular hole of the front differential gear case, and
    a return spring provided between the piston and the front differential gear case to bias the piston toward the chamber.

3. A four-wheel drive vehicle comprising a front wheel side having a front wheel set and a rear wheel side having a rear wheel set, an engine having an output shaft extending in a transverse direction of a vehicular body, a transmission having an input shaft connected to said output shaft of said engine and an output shaft connected through a transmission mechanism to said input shaft such as to extend in a transverse direction of said vehicular body, a rotating member connected to said output shaft of said transmission, a first output member connected to said rotating member for transmitting a power to one of said wheel sides, said rotating member being a differential gear case incorporating a differential gear for one of said wheel sets, and a hydraulic friction clutch for effecting engagement and disenegagement between said rotating member and a second output member for transmitting a power to one of said wheel sides; said hydraulic friction clutch being arranged in an inner circumferential position of said differential gear case.

* * * * *